W. R. TEMPLETON.
STEAM TRAP.
APPLICATION FILED OCT. 5, 1908.
952,482.
Patented Mar. 22, 1910.
3 SHEETS—SHEET 1.
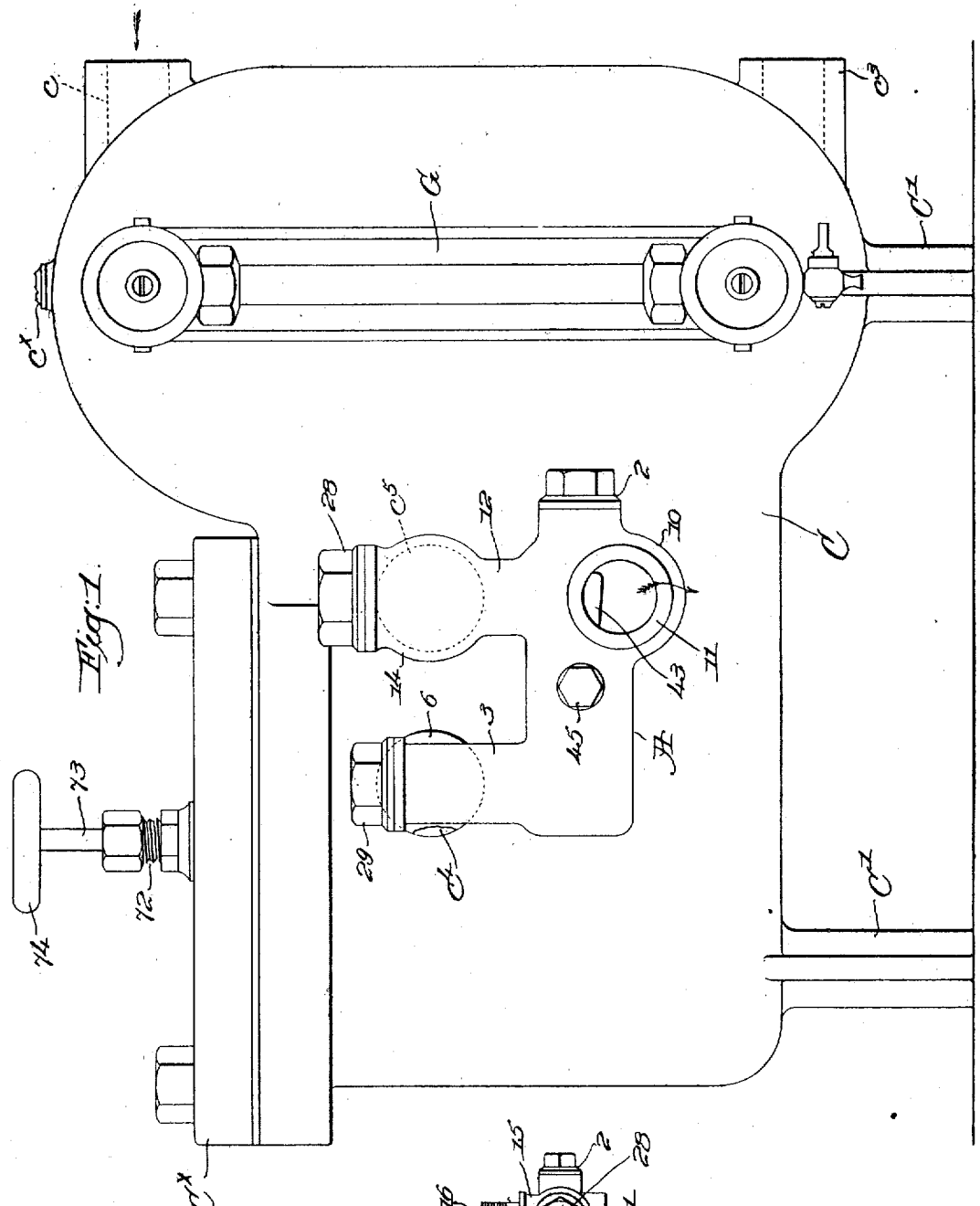

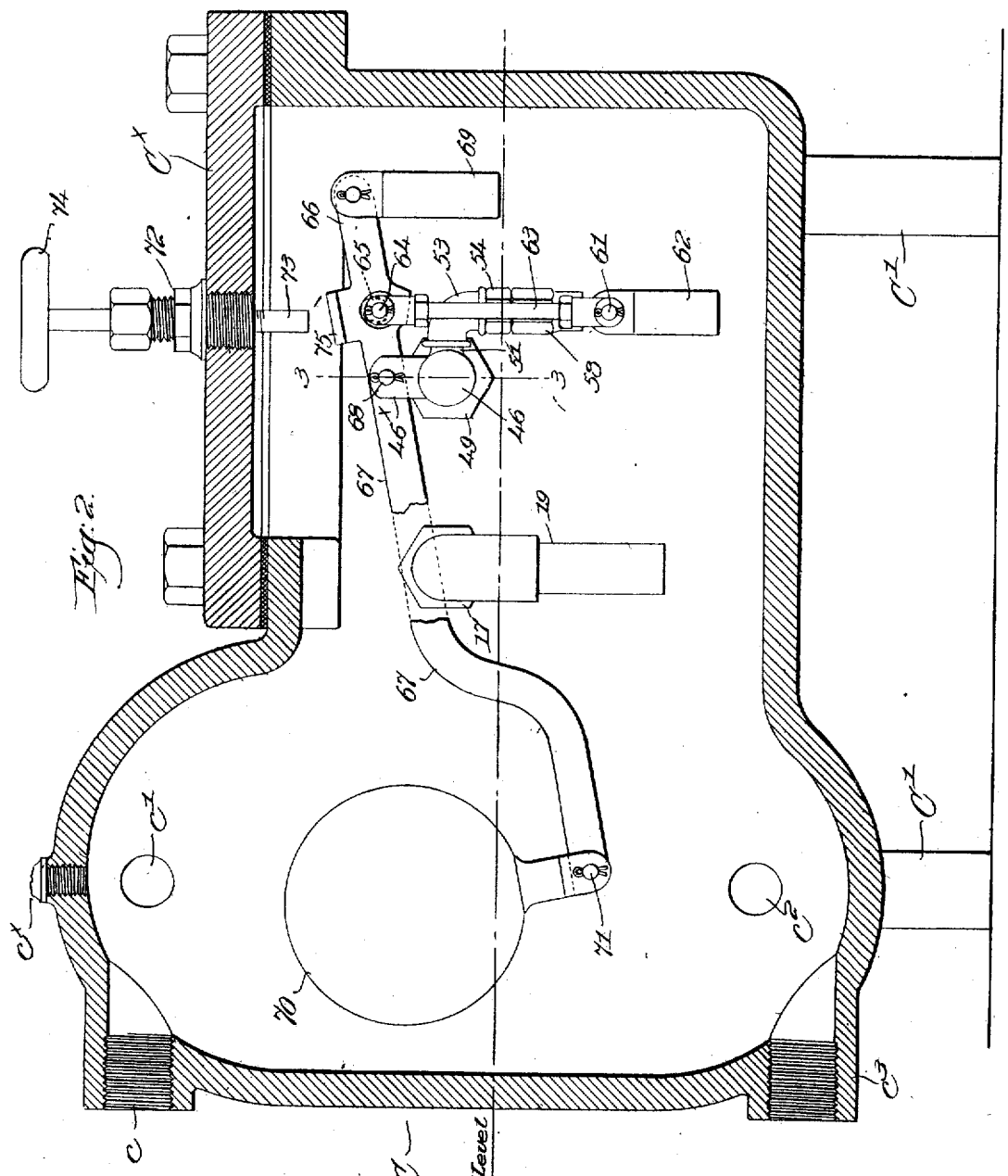

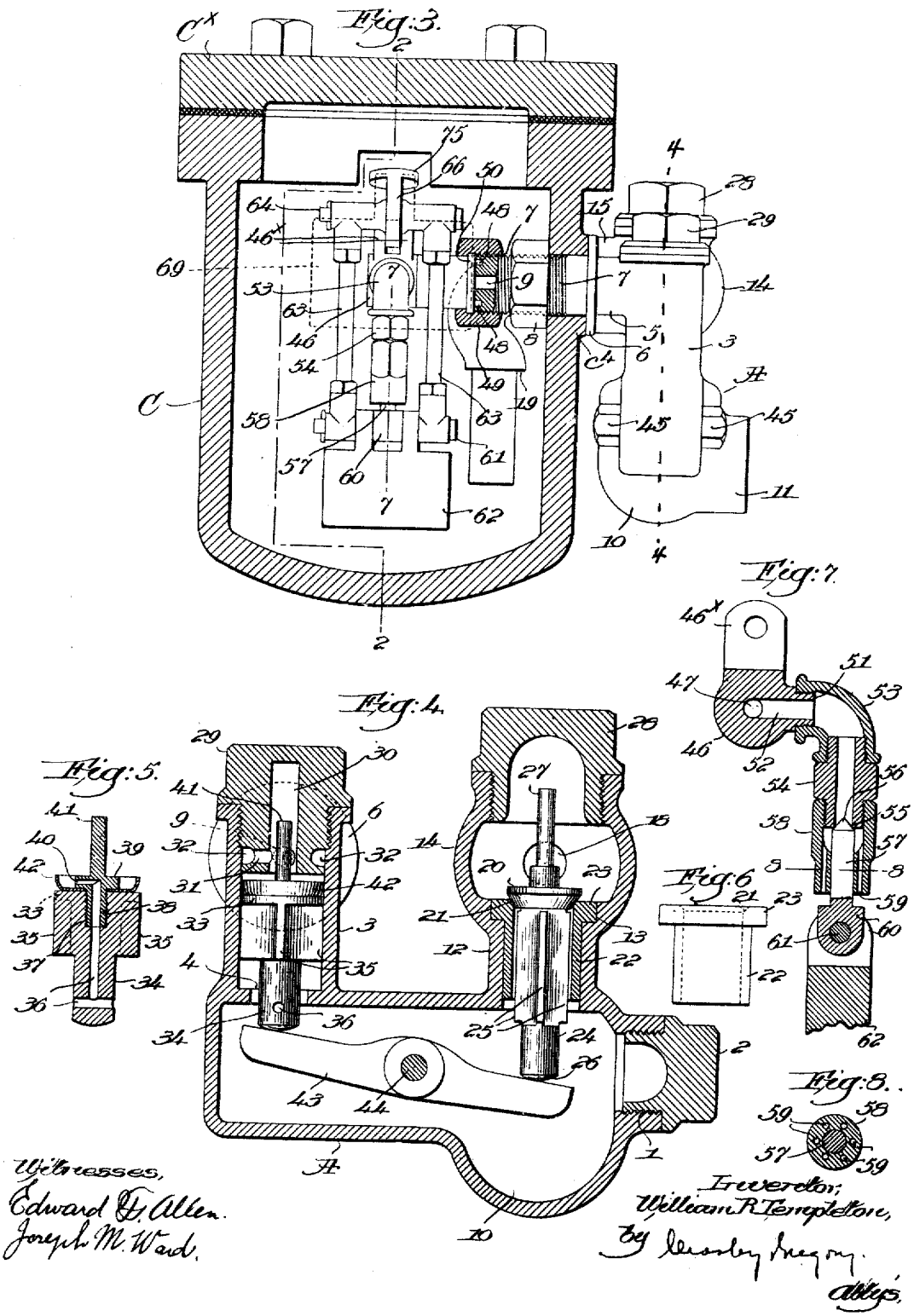

UNITED STATES PATENT OFFICE.

WILLIAM R. TEMPLETON, OF BOSTON, MASSACHUSETTS, ASSIGNOR TO TEMPLETON MANUFACTURING COMPANY, OF BOSTON, MASSACHUSETTS, A CORPORATION OF MAINE.

STEAM-TRAP.

952,482. Specification of Letters Patent. Patented Mar. 22, 1910.

Application filed October 5, 1908. Serial No. 456,330.

*To all whom it may concern:*

Be it known that I, WILLIAM R. TEMPLETON, a citizen of the United States, residing at Boston, in the county of Suffolk and State of Massachusetts, have invented an Improvement in Steam-Traps, of which the following description, in connection with the accompanying drawing, is a specification, like characters on the drawing representing like parts.

This invention relates more particularly to steam traps adapted for use in connection with high pressures, say from 100 pounds to 250 pounds or higher, and it has for its object the production of certain improved features of construction and arrangement whereby the efficiency of the trap is enhanced and the necessary care and oversight thereof simplified and made more easy.

My present invention, specifically, is an improvement on the steam traps forming the subject-matter of United States Patents Nos. 862,295 and 862,296, granted to me the 6th day of August, 1907, and as will appear hereinafter the present trap embodies in its operating parts a main discharge valve opened and closed solely by the fluid pressure within the shell or casing, a controlling or pilot-valve, and means to effect the opening and closing of the latter at the proper times. In the patented structures all of the operative parts of the trap are inclosed within the main shell or casing, making it somewhat difficult and awkward to get at the parts in order to examine and clean or regrind the discharge valve or its seat, and the construction of the piston operatively connected with said valve has at times given trouble because of obstructions to its movements in the cylinder, due to the presence of minute but hard or gritty foreign matter in the water of condensation entering the trap. In my present invention the discharge valve, the cylinder and pressure piston, and the transmitting connection between the latter and said valve are all located in an auxiliary casing mounted on the main casing externally thereto, with readily removable closures whereby access to the parts within the auxiliary casing is easily effected. The discharge valve is easily removed, and I have also made removable the seat for such valve, so that the operation of the trap may be interfered with as little as possible if anything happens to either the valve or its seat. I have also improved the means for connecting the trap with the pressure system, such connections being so arranged that all the operative parts of the trap may be removed if necessary without disturbing such connections. By a novel and efficient construction of the pressure piston I have obviated any obstruction to its operation by the presence of foreign matter in the water of condensation, the piston being practically self-scouring, that is, operating of itself to keep the cylinder free from the passage of solid particles down between the cylinder and the piston.

The various novel features of my invention will be fully described in the subjoined specification and particularly pointed out in the following claims.

Figure 1 is a side elevation of a steamtrap embodying my present invention, viewed from the side at which are located the main valve and controlling piston therefor. Fig. 2 is a longitudinal sectional view of the main shell or casing, and the operative parts, the section being taken on the line 2—2, Fig. 3, looking toward the right. Fig. 3 is a right hand end elevation of the mechanism shown within the casing in Fig. 2, the casing and the connection between the pilot-valve and the external piston cylinder being shown in section on the line 3—3, Fig. 2, looking toward the left, the pilot-valve and adjacent parts being shown in elevation. Fig. 4 is an enlarged vertical section, on the line 4—4, Fig. 3, of the external, auxiliary casing in which the main outlet or discharge valve and the piston are located. Fig. 5 is a diametrical section of the piston, to be referred to. Fig. 6 is a side elevation of the removable seat for the main valve. Fig. 7 is an enlarged section of the pilot-valve and adjacent parts, on line 7—7, Fig. 3. Fig. 8 is a cross-section on the line 8—8, Fig. 7. Fig. 9 is a top plan view, on a small scale, of the auxiliary casing.

Referring to the drawings, C is the main shell or casing, supported on feet or legs C' and having an inlet $c$, Fig. 2, and openings $c'$ $c^2$ for connection with a water or gage-glass G, Fig. 1, usually employed in connection with steam traps, the casing having a nipple $c^3$ for connection with a suitable sediment blow-off cock, not shown, and the usual pet-cock, shown in part at $c^x$, Figs. 1 and 2. At one end of the casing an opening in its top is normally closed fluid-tight by a closure or cover-plate $C^x$, access to the interior of the casing being had by removal of the closure.

On the front wall of the casing C, viewing Fig. 1, are formed two tubular bosses $c^4$, $c^5$, arranged side by side by means of which an auxiliary casing A is secured to the exterior of the main casing. One end of the body of the auxiliary casing is internally threaded at 1, Fig. 4, to receive a plug 2 screwed thereinto to tightly close the end, and at its opposite end the body is formed with an upright cylinder 3 communicating at its lower end at 4 with the body. The auxiliary casing is made as a casting, the cylinder near its upper end having a lateral, tubular portion 5 flanged at 6, Fig. 3, to rest against the face of the boss $c^4$. An externally threaded extension 7 of the portion 5 is arranged to pass through the boss $c^4$ into the casing C and be clamped tightly in place by a nut 8, Fig. 3.

Communication between the main casing and the cylinder 3 of the auxiliary casing is established by the bore 9 of the part 5 and its threaded extension 7, the body of the auxiliary casing near the plug 2 being preferably bulged or enlarged, as at 10, and having a forwardly extended nipple 11 for connection with a discharge pipe or conduit (not shown) for the trap. This nipple is of relatively large diameter, see Fig. 1, and provides for the discharge of a large stream of water from the trap, and in practice the nipple will be preferably internally threaded for connection with the discharge pipe.

The body of the auxiliary casing A has formed upon it above the enlargement 10 an upright, tubular boss 12 having an internal annular shoulder portion 13, Fig. 4, and the boss at its upper end assumes a globular form at 14, provided with a lateral, tubular extension 15 reduced in diameter and threaded, as at 16, Fig. 9, to enter the boss $c^5$ on the main casing, the end of the extension 15 abutting against the outer face of said boss. A nut 17 is screwed up tightly on the part 16, so that the auxiliary casing and its contained parts are rigidly secured to the wall of the main casing by the nuts 8 and 17, the bore or passage 18 of the extension 15 and its threaded portion 16 entering the globular valve-chamber 14, as shown in Fig. 4.

Screwed onto the threaded end 16 beyond the nut 17 is a downturned branch 19, see Figs. 2 and 3, the lower end or mouth of which is at all times below the low-water level in the main casing, the water to be discharged passing up through the branch 19 and the passage 18 to the valve-chamber 14, in which is located the main outlet or discharge valve 20. Said valve is coned to coöperate with a conical valve-seat 21 constituting an outlet or discharge port for the trap and formed on the upper end of a tube 22, Figs. 4 and 6, which slips easily into the boss 12, an annular head 23 on the tube resting in the annularly shouldered part 13 of the boss. The depending valve-stem 24 has radial wings or guides 25 which slide easily within the tube 22, said stem terminating in a rounded or convexed end 26 within the body of the casing A. When said valve is seated communication between the casing C of the trap and the outlet or discharge port thereof is completely shut off. The valve has an upturned spindle 27 which extends into a recessed cap 28 which is normally screwed down fluid tight into the threaded top of the valve-chamber 14, as shown in Fig. 4.

To inspect the valve 20 the cap is removed and the valve can then be withdrawn by means of its spindle 27, and if the seat 21 is in need of attention the tube 22 is lifted up and taken out of the boss 12 through the valve-chamber. It will be obvious that removal of the valve and its seat can thus be easily accomplished without in any way disturbing the connections between the trap and the pressure system, though the pressure must first be shut off from the trap by the usual valve provided in the pipe leading to the main casing C. Should the valve or its seat be broken, or one or both need attention, new parts can be quickly substituted and the operation of the trap will be interrupted for a few minutes only.

The cap 28 acts upon the upper end of the spindle 27 to limit upward or opening movement of the valve, as will be apparent, and by reference to Fig. 4 it will be seen that the cross-sectional area of the cylinder 3 is considerably greater than the area of the valve.

The cylinder 3 is closed by a screw-cap 29 having a central, longitudinal recess 30 communicating by radial passages 31, Fig. 4, with an annular groove 32 formed in the cap near its inner end, said groove being opposite and communicating with the bore 9 when said cap is screwed home. A peculiarly constructed piston is vertically movable in the cylinder, said piston comprising a relatively thin disk 33 formed on the upper end of a depending stem 34 having radial wings 35, the disk and wings sliding freely in the cylinder, the stem having a passage 36 through it (see Fig. 5). The upper end of the longitudinal part of the passage 36 is enlarged and threaded, at 37, to receive the tubular shank 38 of a nut 39, bored at 40, Fig. 5, to communicate with the passage in the shank, and having an upright spindle 41. Between the nut and the disk is interposed a thin, cup-like metallic diaphragm 42 the upper edge of which snugly fits the cylinder 3. The passage 40 is much smaller in area than the bore 9 and the passages 31 and groove 32, so that when the pressure within the main casing C is admitted to the cylinder above the piston the latter will be forced downward, but when such casing pressure is shut off the steam in the cylinder above the piston can escape through the passages 36, 40, as the piston rises. When pressure is admitted to the cylinder it tends to slightly spread the diaphragm 42 and form a fluid-tight fit between its edge and the cylinder, so that the proper operation of the piston is insured, but this diaphragm also acts as a cleaner or scraper, to prevent jamming or sticking of the piston by the entrance of fine particles of grit, etc. When the piston is made of considerable thickness, as in the patents herein referred to, trouble will at times be experienced because foreign matter will wedge between the piston and cylinder, and prevent the proper operation of the piston. Herein, however, this cannot occur, for the disk 33 does not fit tightly in the cylinder, but serves as a support and guide for the relatively flexible member or diaphragm 42, the latter acting, when fully expanded by the casing pressure, to provide the tight fit requisite for the piston and also to scrape or scour the cylinder walls free of grit or other foreign matter which may enter the cylinder.

As in my prior patents, I herein operatively connect the piston and the outlet valve in such manner that when the valve is seated the piston will be raised, and when the piston is moved downward the outlet valve will be raised from its seat, the piston being of larger area than the valve and also heavier than said valve and its stem. Consequently, when there is no pressure in the trap, the weight of the piston will cause it to descend and lift the outlet valve, automatically discharging the trap down to the low water level without requiring any attention to vent the trap.

The connection between the valve and piston is the rocking lever or transmitter 43, Fig. 4, fulcrumed at 44 in the body of the casing A, and the rounded lower ends of the valve and piston stems 24, 34, rest upon the ends of the transmitter, substantially as in my Patent No. 862,296, the operation being obvious; for if the piston descends the transmitter will be rocked and thereby the valve 30 will be unseated, and when the valve is seated by the casing pressure the piston will be lifted. The fulcrum pin 44 is held in the body of the auxiliary casing by screw-caps 45, Fig. 9, as in the patent just referred to. Herein the controlling or pilot-valve and the actuating means therefor are located in the main casing C, as in said patent, and while such devices herein are substantially the same as in the patent I will briefly describe the structure and point out such changes as have been made.

A cylindrical head 46 has a longitudinal passage 47 extended part way through it, to register with the bore 9 of the extension 7, see Fig. 3, the inner end of the latter being recessed to receive positioning pins 48 on the adjacent end of the head, which abuts against the end of the extension and is firmly clamped thereon fluid tight by a coupling nut 49, shown in section, an annular flange 50 on the head being gripped by the nut. Said head has a lateral nipple 51, Fig. 7, communicating by passage 52 with the passage 47, and a bend 53 is screwed onto the nipple, said bend having an attached depending nipple 54, the lower end of which forms an annular valve-seat 55 with which coöperates the conical end 56 of the auxiliary or pilot-valve, the stem 57 thereof being vertically slidable in the lower end of the valve-chamber 58. Said valve-chamber is screwed onto the lower end of nipple 54 and has a series of longitudinal passages 59 extending upward from its lower end into the space adjacent the valve-seat 55, as shown in Fig. 7. The valve-stem 57 is enlarged at its lower end, at 60, and has extended transversely through it a cross-bar 61, on which is hung a weight 62, the outer ends of the cross-bar having pivotally mounted thereon upturned links 63, Figs. 2 and 3, the upper ends of the links being pivotally connected with a pin 64, substantially as in the Patent No. 862,296. Said pin passes loosely through a slot 65, see dotted lines Fig. 2, in a rocking actuator, shown as a lever having a short arm 66 and a long arm 67 and fulcrumed at 68 between ears 46* on the head 46, the lever rocking in a vertical plane, substantially as in the patent just referred to. From the short arm 66 is suspended a counterbalancing weight 69, shown by dotted lines Fig. 3, and a strong float 70 is pivotally connected at 71 with the downturned end of the long arm 67, the float being made strong enough to withstand the crushing effect of high pressures in the casing C. By the slot 65 there is lost motion between the actuator and the pilot-valve, so that a limited movement of the actuator on its fulcrum 68 can take place before causing any movement of said valve toward or from its seat.

As to the operation of the trap, it is supposed that the apparatus shown in Fig. 2 is in the position assumed when the trap is under pressure, and that it has been discharged. As the water accumulates in casing C the float 70 is raised, rocking the actuator 66, 67, but the valve 56 remains seated, as the casing pressure acting on the enlarged end 60 of the stem maintains the valve closed, the slot 65 permitting the relative movement of the actuator until the rise of the water is sufficient to bring the upper end of the slot against the pin 64. Thereupon the slightest additional movement of the actuator will move the valve 56 from its seat, and instantly the valve drops the length of the slot 65 to full open position, such movement being hastened by the weight 62. The cylinder 3 above the piston is now in full communication with the casing C, the pressure therein acting to depress the piston and open the outlet valve 20, thereby discharging the trap, the water passing through passage 18 into the external valve-chamber 14, through the valve-seat or outlet port 21 and down into the body of the auxiliary casing A, passing thence through the nipple 11 into the discharge pipe, not shown.

The opening or lifting of valve 20 is effected through the transmitter 43, as will be obvious. This operation is substantially the same as in my Patent No. 862,296, and as the trap discharges and the water level falls in the casing C the actuator 66, 67 gradually returns to normal position, but the pilot-valve 56 is not seated until the bottom of slot 65 picks up the pin 64 just before low water level is reached. Once seated said valve is held on its seat by the casing pressure until it is time for the trap to again discharge. When said valve is closed the fluid pressure in the cylinder 3 above the piston is permitted to escape through the passages 36, 40, Fig. 5, the casing pressure acting upon the outlet valve 20 to promptly close it, and the gradual escape of the fluid from the cylinder cushions the return movement of the outlet valve so that it will not be seated with a hard blow.

The moving parts within the auxiliary casing can be removed by unscrewing the caps 28, 29 and the plug 2, without interfering with the setting of the trap as a whole, and so too, by removing the cover plate C<sup>×</sup> the actuator, pilot-valve and connections can be removed after the coupling nut 49 is unscrewed from the extension 7. This is of great value, as the working parts of the trap can be examined, removed and repaired or replaced, as may be necessary, in a very short time and without any interference whatever with the connections between the pressure system and the main casing or with the discharge pipe leading from the auxiliary casing A.

It is sometimes desired to ascertain whether or not the actuator and the connections between it and the pilot-valve are in proper operative condition, without removing the cover-plate C<sup>×</sup>, and for this purpose I have provided a testing device operated from the exterior of the main casing.

A stuffing-box or gland 72 is tightly screwed into the cover-plate above the actuator, between its fulcrum 68 and the free end of the short arm 66, see Fig. 2, and in the stuffing box is mounted a longitudinally movable spindle 73 provided at its upper end with a hand-wheel 74, the spindle being threaded to move longitudinally in the stuffing-box when rotated. The lower end of the spindle is adapted to coöperate with an enlargement 75 on the actuator arm 66, so that when the spindle is screwed down it will act upon the enlargement and rock or tilt the actuator to remove the pilot-valve from its seat, just as if the rise of the water in the casing had operated, thereby discharging the trap by hand.

So far as concerns the actuator, the pilot-valve and its connections with said actuator, and the means for rocking the latter it will be obvious that the parts specified may be the same as shown in my Patent No. 862,296, if desired.

Having described my invention, what I claim as new and desire to secure by Letters Patent is:—

1. The combination with the casing of a steam trap, of a discharge port therefor and a coöperating valve, both accessible externally of the casing, said valve being closed by fluid pressure within the casing, and means to govern the opening and closing of said valve, including a cylinder intermittingly communicating at one side only of its piston with the interior of the casing, and a piston freely movable in the cylinder and having attached to it at its pressure-receiving side a flexible cup-like metallic diaphragm to coöperate with the cylinder walls when the piston is subjected to the casing pressure through such intermitting communication with the casing.

2. The combination, with the main casing of a steam trap, of an external auxiliary casing comprising a horizontal body provided with an outlet, an upright cylinder and an upright valve chamber on said body opening thereinto at their lower ends, removable closures for the upper ends of said cylinder and chamber, tubular extensions leading from the valve chamber and the upper end of the cylinder to the interior of the main casing and rigidly connected therewith, a vertically movable outlet valve in the chamber, a removable seat therefor constituting a discharge port for the trap and located in the chamber below the adjacent end of the extension leading therefrom, said extension establishing continuous communication between the valve chamber and the interior of the main casing, to effect closure of the outlet valve by direct action of fluid pressure thereupon, a vertically movable piston in the cylinder below the adjacent end of the extension communicating therewith, transmitting means within the body of the auxiliary casing to insure movement in opposite directions of said outlet valve and piston, and means within the main casing to control the admission of fluid pressure therefrom to the cylinder through the communicating extension according to the rise and fall of the water in the main casing.

3. The combination with the main casing of a steam trap, of an external, auxiliary casing comprising a substantially horizontal body and communicating therewith a cylinder and a valve chamber, arranged side by side, removable closures therefor, an outlet valve and a valve-seat therefor constituting a discharge port for the trap, both removably mounted in said valve chamber, the latter communicating continuously with the interior of the main casing to effect closure of the outlet valve by direct action of fluid pressure in the casing, a piston vertically movable in the cylinder, rocking transmitting means within the body of the auxiliary casing, to operatively connect the piston with the outlet valve, and means within the main casing to control the admission of fluid pressure therefrom to the cylnder according to the rise and fall of the water in said main casing.

4. The combination with the casing of a steam trap having a discharge port, of a valve therefor adapted to be closed by fluid pressure within the casing, and means to govern the opening and closing of said valve, including a cylinder intermittingly communicating with the interior of the casing, and a piston comprising a relatively thin disk having depending, radial guides freely movable in the cylinder, and a thin metallic diaphragm fixed on the disk and adapted to coöperate with the cylinder walls when the piston is subjected to the casing pressure.

5. The combination, with the casing of a steam trap having a discharge port, of a valve therefor adapted to be closed by fluid pressure within the casing, and means to govern the opening and closing of said valve, including a cylinder intermittingly communicating with the interior of the casing, and a piston comprising a relatively thin disk having depending, radial guides freely movable in the cylinder, and a thin metallic diaphragm fixed on the disk and adapted to coöperate with the cylinder walls when the piston is subjected to the casing pressure, the piston having a small passage through it to permit the fluid contents of the cylinder to escape gradually when communication between the cylinder and casing is shut off.

6. The combination, with the casing of a steam trap having a discharge port, of a valve therefor adapted to be closed by fluid pressure within the casing, and means to govern the opening and closing of said valve, including a cylinder intermittingly communicating with the interior of the casing, and a piston including a part freely movable in the cylinder, and a cup-like, flexible metallic diaphragm adapted to be forced tightly against the cylinder walls when the piston is subjected to the casing pressure.

In testimony whereof, I have signed my name to this specification, in the presence of two subscribing witnesses.

WILLIAM R. TEMPLETON.

Witnesses:
JOHN C. EDWARDS,
FREDERICK S. GREENLEAF.